United States Patent [19]
Fulks

[11] 3,828,156
[45] Aug. 6, 1974

[54] WELDING MACHINE
[75] Inventor: John Arthur Fulks, Hemel Hempstead, England
[73] Assignee: Rolls-Royce (1971) Limited, London, England
[22] Filed: July 13, 1973
[21] Appl. No.: 378,814

[30] Foreign Application Priority Data
July 20, 1972   Great Britain .................... 33901/72

[52] U.S. Cl. .............................................. 219/60 A
[51] Int. Cl. .................................................. B23k 9/00
[58] Field of Search... 219/60 A, 61, 125 R, 125 PL

[56] References Cited
UNITED STATES PATENTS
| | | | |
|---|---|---|---|
| 2,459,047 | 1/1949 | Scharf | 219/61 X |
| 3,137,782 | 6/1964 | Rieppel et al. | 219/61 |
| 3,536,879 | 10/1970 | Hartsell et al. | 219/60 A |
| 3,634,648 | 1/1972 | Morris et al. | 219/125 R |

*Primary Examiner*—J. V. Truhe
*Assistant Examiner*—N. D. Herkamp
*Attorney, Agent, or Firm*—Stevens, Davis, Miller & Mosher

[57] ABSTRACT

A machine for use in the welding of a pipe to a pipe-end fitting comprising several carriages, mounted on a main frame, and capable of receiving a pipe and a pipe-end fitting and aligning them in an abutting relationship one to the other and relative to an orbital welding head which is mounted from one of the carriage means. The machine is particularly adapted for batch work in that after setting up for the welding of the first assembly repetitive work can then be carried out with a reduced number of setting up adjustments for subsequent welding of assemblies.

4 Claims, 5 Drawing Figures

WELDING MACHINE

The invention relates to a machine which has been designed for use in the welding of pipes to pipe-end fittings and is primarily, though by no means exclusively, intended for repetitive work.

At the present time it is a common practice in the welding of pipes to pipe-end fittings to produce the pipe-end fitting with an integral filler lip which surrounds the end portion of the pipe-end fitting and extends forwardly of the end face of the pipe-end fitting in order that when the end face of the pipe is abutted to the end face of the pipe-end fitting the filler lip co-axially aligns the pipe relative to the pipe-end fitting.

One disadvantage of this practice is that the filler lip requires accurate machining and this significantly increases the cost of the pipe-end fitting. Another disadvantage is the controlling of the size of the weld underbead, due to the excess filler material from the filler lip, which affects the flow profile of the bore of the welded assembly particularly in relation to small bore pipes. The term "filler lip" is a well understood term in this branch of technology and is therefore used in this specification. When first introduced several years ago it was believed that filler lips were necessary in order to provide filler material but experience has shown this belief to be mistaken. However, the advantage given by using a filler lip for location purposes was then realised and its use continued under a now misleadingly descriptive name.

Trials have shown that a pipe-end fitting without a filler lip can be satisfactorily butt welded to a pipe provided that they are co-axially aligned and their respective end faces are in overall abutment. Furthermore the size of the resulting underbead is acceptable. The provisos that the pipe and the pipe-end fitting are co-axially aligned and that their respective end faces are in overall abutment are difficult to achieve in practice and the machine according to the invention overcomes these difficulties. The machine also gives advantages when used with a pipe-end fitting which includes an integral filler lip as will be described later in this specification.

The machine, which includes a welding means, as for an example an orbital welding electrode, is adapted first to receive and rigidly support a pipe and a pipe-end fitting, secondly to locate an end face of a tubular sectioned portion of the pipe-end fitting in a desired position relative to the welding means which position in the example is in co-axial and co-planar alignment with the orbital welding electrode, thirdly to grind an end face of the pipe to a plane which is parallel to the plane of the end face of the pipe-end fitting, fourthly to abut the pipe-end face in co-axial alignment with the end face of the pipe-end fitting and fifthly to circumferentially weld the pipe and the pipe-end fitting together at their abutment in a controlled environment by operation of the welding means.

In performing this sequence of steps a number of adjustments have to be made to the components of the machine but thereafter in the case of repetitive work the number of adjustments is much reduced as will be described later.

According to the invention there is provided a machine for use in the welding of a pipe to a pipe-end fitting and comprising a main frame supporting a plurality of carriage means which are each one capable of movement relative to the main frame to a desired position, and a welding means mounted from at least one of said carriage means, said plurality of carriage means being adapted to receive and then to locate a pipe and a pipe-end fitting in a desired relationship, one to the other, with an end face of said pipe in co-axial alignment with and abutting an end face of said pipe-end fitting, and with said abutment so positioned relative to the welding means that said pipe and said pipe-end fitting are then capable of being circumferentially welded together at their abutment by operation of the welding means.

In a preferred embodiment of the invention the machine is provided with means to control the environment of said abutment to the condition required for the welding operation.

In a further preferred embodiment of the invention the welding means is an orbital welding electrode and said abutment is positioned in the plane of orbit of the orbital welding electrode.

In yet a further preferred embodiment of the invention the machine includes a means for machining the end face of the pipe.

The invention will now be described, by way of example only, with reference to the accompanying drawings in which.

Figure 1:
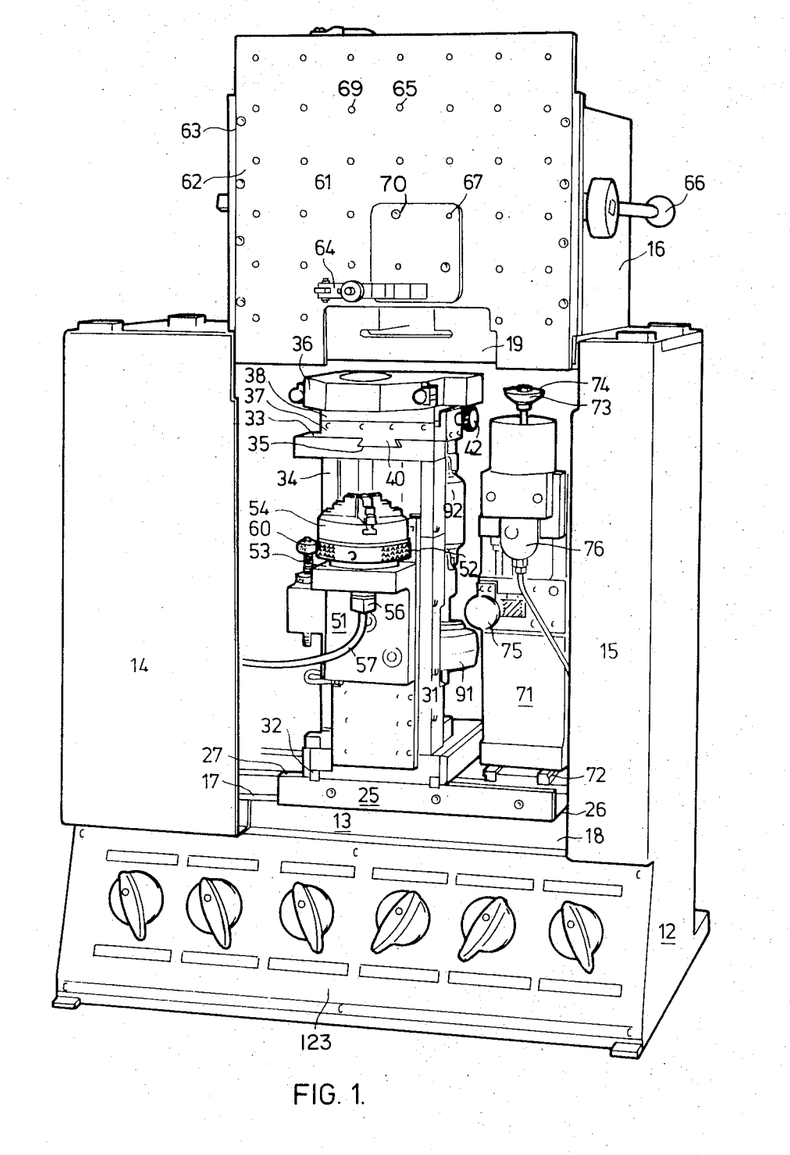
FIG. 1 is a three-quarters perspective view of the welding machine.

Referring to FIG. 1 the welding machine 11 comprises the following major components:

a. a main frame 12
b. a lower carriage 25
c. a welding head carriage 31
d. a lower jig table 51
e. an upper jig table 61
g. a grinding wheel carriage 71

These major components will now be described in detail under their respective sub-headings.

a. The main frame 12 comprises a base 13 and two side walls, 14 and 15 respectively, which support an upper structure 16. The base 13 has an upper surface 17 and a front edge face 18. The upper structure 16 has a front face 19 which lies in a plane parallel to the plane of the front edge face 18.

For the purpose of simplifying this description it is assumed that the welding machine is resting on a horizontal surface and the upper surface 17 of the base 13 lies in a horizontal plane.

b. The lower carriage 25 is mounted from the base 13 on "cross-linear" roller bearings 26 and is capable of controlled sliding movement relative to the base 13 in directions which are parallel to the front edge face 18 and the upper surface 17 of the base 13.

c. The welding head carriage 31 is mounted from the upper surface 27 of the lower carriage 25 on "cross-linear" roller bearings 32 and is capable of controlled sliding movement relative to the lower carriage 25 in directions which are normal to the base front edge face 18 and parallel to the upper surface 17 of the base 13.

The welding head carriage 31 has an upper surface 33 and a front face 34. The upper surface 33 lies in a plane parallel to the base upper surface 17 and the front face 34 lies in a plane which is normal to the plane of the base upper surface 17 and parallel to the base front edge face 18.

The upper surface 33 of the welding head carriage 31 is provided with a dovetail sectioned recess 35 which extends across the length of the surface 33 in a direction normal to the base front edge face 18.

A motor driven orbital welding head 36 is mounted from the upper surface 33 of the welding head carriage by means of two intermediate plates, designated as first plate member 37 and second plate member 38.

The first plate member 37 has upper and lower surfaces respectively parallel to the base upper surface 17, said upper surface being provided with a dovetail sectioned recess 39 which extends across the length of the surface in a direction parallel to the base front edge face 18, and said lower surface having a dovetail sectioned key 40 projecting therefrom and extending across the length of the surface in a direction normal to the base front edge face 18. The dovetail section key 40 engages with a substantially tight fit in the recess 35.

A first hand-actuated worm-and-wheel drive means (not shown) is provided to adjust the position of the first plate member relative to the upper surface 33 of the welding head carriage 31.

The second plate member 38 has upper and lower surfaces respectively parallel to the base upper surface 17 and said lower surface has a dovetail section key 41 projecting therefrom and extending across the length of the surface in a direction parallel to the base front edge face 18. The dovetail section key 41 engages with a substantially tight fit in the recess 39 in the first plate member.

A second hand-actuated worm-and-wheel drive means 42 is provided to adjust the position of the second plate member 38 relative to the upper surface of the first plate member 37.

The welding head 36 is fixedly attached to the upper surface of the second plate member 38 by screws 43 and is thus capable of controlled sliding movement by means of the first and second plate members in two planes both parallel to the welding carriage upper surface 33 and respectively parallel and normal to the base front edge face 18.

The motor driven orbital welding head 36, which is of a known construction, is connected to a driving motor 91 and comprises a welding electrode 44 mounted from a rotatable annular ring assembly 45 and projecting radially inwardly therefrom. The annular ring assembly 45 is supported from a bearing housing 46 and rotates about an axis which is normal to the base upper surface 17. The annular ring assembly 45 is provided with gear teeth 47 which project from its outer peripheral surface and drivingly engage with speed reduction gearing (not shown). The speed reduction gearing is drivably connected to the driving motor 91 through linkage means 92. The driving motor which is electrically driven has an infinitely variable speed capability within the rotational speed range chosen for the welding electrode 44.

The welding head 36 includes brush means (not shown) for conducting electrical power from a remote source to the annular ring assembly and the welding electrode. The rest of the head, excepting the speed reduction gearing being constructed from electrically non-conductive materials. At least one portion of the linkage means 92 is constructed from electrically non-conductive material to prevent the flow of electrical current from the speed reduction gearing to the driving motor 91.

The welding head 36 further includes a conduit (not shown) to provide flow connection between an external argon gas supply and radially extending holes 93 in the annular ring assembly in order that argon gas may be supplied to the space surrounding the welding electrode 44.

Figure 3:
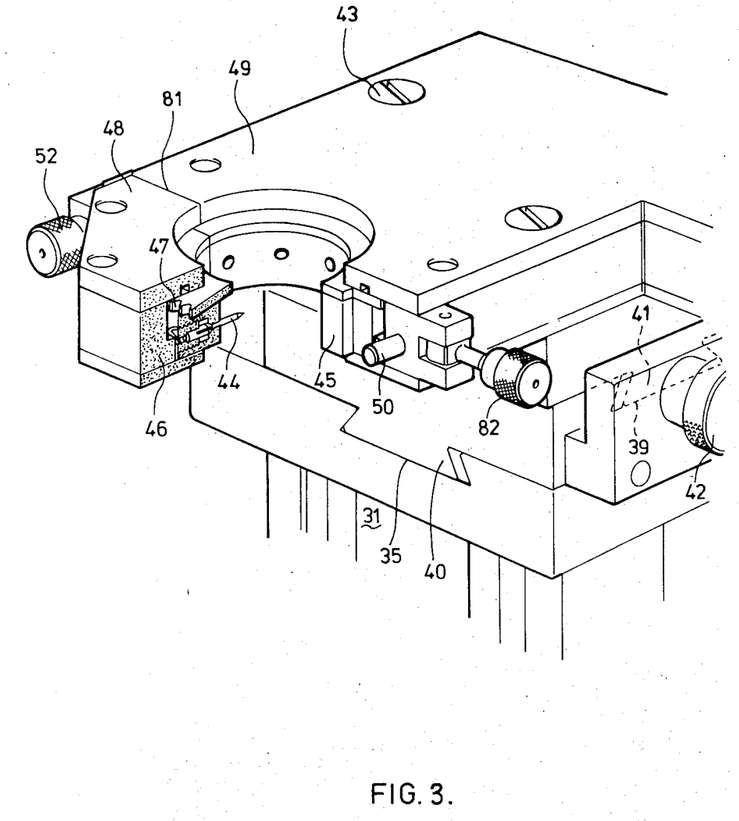

In order that the welding head 36 may be used to weld a pipe to a ring construction, such as a fuel manifold ring for a gas turbine engine, the welding head 36 is constructed in two sections 48 and 49 (see FIG. 3), the sections being accurately located one to the other by dowels 50 and held in abutting relationship at their joint interface 81 by pivotable eye bolt and screw assemblies 82. The annular ring assembly 45 is sectioned across a chordal dimension, the sections being held in abutment by the welding head sections 48 and 49. Thus by slackening the screws of assemblies 82 and pivoting them out of engagement with section 48, the section 48 and a section of the annular ring assembly can be removed and a ring construction introduced into the annular ring assembly. The section 48 and the section of the annular ring assembly are then replaced, the ring construction being supported from clamping means mounted on the lower jig table 51.

d. The lower jig table 51 is mounted from the front face 34 of the welding head carriage 31 on "cross-linear" roller bearings 52 and is capable of controlled sliding movement relative to the welding head carriage 31 in a plane normal to the base upper surface 17 (i.e., vertically). The lower jig table has an upper surface 53 which lies in a plane parallel to the base upper surface 17 and has fixedly attached thereon a self-centering chuck 54 for rigidly supporting a pipe-end fitting 55 with the end face thereof, which is to be welded to a pipe, lying in a plane parallel to the base upper surface 17. The self-centering chuck 54 could be replaced by a collet or any other suitable clamp for rigidly supporting the pipe-end fitting in the same manner as the self-centering chuck. The table 51 includes a connection 56 to provide flow connection during the welding operation from a flexible argon gas supply pipe 57 through the pipe-end fitting 55 via conduits 58 and 59 in the table 51 and the self-centering chuck 54 respectively. The height to which the lower jig table 51, and hence the pipe-end fitting 55 is to be raised is selected by means of a manually adjustable stop 60 which is rigidly attached to the lower jig table and which abuts an upper portion 83 of the welding head carriage 31.

e. The upper jig table 61 comprising a plate 62 is mounted from the upper structure front face 19 on "cross-linear" roller bearings 63 and is capable of controlled sliding movement relative to the upper structure front face 19 in a plane normal to the base upper surface 17. One or more clamping means 64 for securing a pipe 68 are located on and rigidly supported from the plate 62 by means of dowels 67 and screws 70 respectively, the screws being in threaded engagement with threaded holes 65 in the plate 62 and the dowels engaging in holes 69 in the plate 62. The threaded holes 65 and the holes 69 are alternately disposed in parallel rows across the plate 62. The upper jig table 61 is moved to the desired position relative to the upper structure 16 by means of a lever arm 66 which is rotatably mounted from the side wall 15. The lever arm 66 is connected to the upper jig table 61 through a linkage system which includes counterbalancing means to maintain the upper jig table in a desired position.

g. The grinding wheel carriage 71 is mounted from the lower carriage 25 on "cross-linear" roller bearings 72 and is capable of controlled sliding movement relative to the lower carriage 25 in a direction normal to the base front edge face 18. A grinding wheel 73 is rotatably mounted on the carriage 71 with its grinding face 74 lying in a plane parallel to the base upper surface 17. The grinding wheel 73 may be raised or lowered relative to the grinding wheel carriage 71 by means of hand-actuated worm-and-wheel drive means 75. The grinding wheel carriage supports also an air-driven motor 76 which is drivably connected to the grinding wheel 73.

The "cross-linear" roller bearings 26, 32, 52, 63 and 72 are of a known construction and the lack of sideplay in this type of bearing affords the accuracy required in the positioning of the various major components of this machine. A section of the "cross-linear" roller bearing 32 in shown in FIG. 5.

Figure 5:
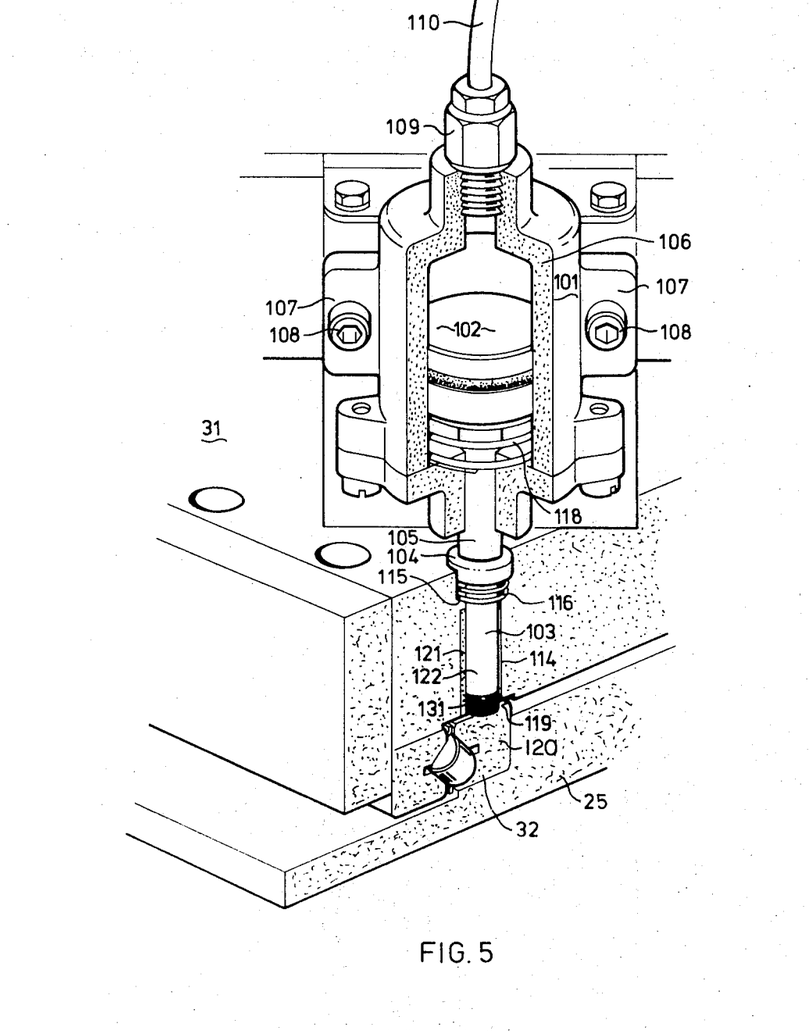

FIG. 5 shows in part-section a stop device 101 mounted from the weld head carriage 31. When the stop device is actuated the welding head carriage 31 is locked in position against further movement relative to the lower carriage from which it is mounted on the "cross-linear" roller bearing 32 until the stop device is released.

The stop device comprises a piston and cylinder arrangement 102 and a spring-loaded plunger 103 having a head 104 which abuts the piston rod 105 of the piston and cylinder arrangement 102.

The piston and cylinder arrangement includes a cylindrical housing 106 having external lugs 107 which are in bolted connection with the welding head carriage 31 by means of bolts 108. The housing 106 is provided with pipe connection means 109 to give flow connection between a pipe 110 and the interior of the housing.

The stem 112 of the spring-loaded plunger 103 has a friction pad 113 bonded to its tip. The friction pad 113 is made of a material having a high coefficient of sliding friction.

The plunger 103 is mounted in a stepped hole 114 in the base of the welding head carriage 31 from a shoulder 115 in the wall of the hole by means of a coiled spring 116 which engages with the plunger head 104. The spring 116 urges the plunger head 104 into abutment with the piston rod 105.

In actuation of the stop device pressurised air is supplied through the pipe 110 to the interior of the cylindrical housing to move the piston and plunger against the action of the spring 116 and a piston spring 118 until the friction pad 113 contacts the surface 119 of a race 120 of the "cross-linear" roller bearing 32, the race 120 being fixedly attached to the lower carriage 25.

The hole 114 is provided with a bush 121 which forms a sliding fit with the stem 112. Thus in the locked position the plunger has no radial play which would affect the position of the welding head carriage 31 relative to the lower carriage 25. To release the stop device the supply of pressurised air is switched off and the springs 116 and 118 return the plunger and piston to their former position so that the friction pad 113 no longer contacts the surface of the race 120.

The lower carriage 25, the upper jig table 61 and the grinding wheel carriage 71 are each provided with a stop device 101 to lock them in a desired position relative to the respective bases from which they are mounted.

Pressurised air from an external source is used for actuating the four stop devices 101, for driving the air-driven motor 76 which is mounted on the grinding wheel carriage, and to raise the lower jig table 51 together with the adjustable stop 60 that the stop 60 abuts the upper portion 83 of the welding head carriage. The four stop devices, the lower jig table and the air-driven motor each have a separate flow connection path to the external source of pressurised air, and each flow path is controlled by a respective on-off switch. The six on-off switches are mounted on a control panel 123 attached to the front of the base 13 (see FIG. 1).

Figure 2:
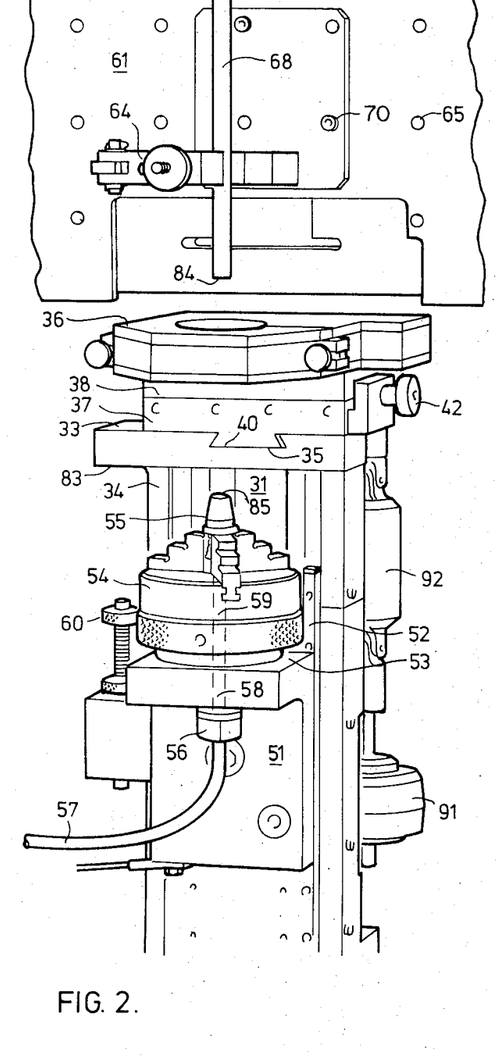
FIGS. 2, 3, 4 and 5 are enlarged fragmentary views of portions of the welding machine with FIGS. 2 and 4 showing a pipe and a pipe-end fitting mounted on the machine.

The sequence of operations and adjustments performed on the machine in order to rigidly locate a pipe and a pipe-end fitting in abutting relationship and then to circumferentially weld them together at the joint interface using a tungsten inert gas process will now be described. It will be understood that the pipe-end fitting has a tubular sectioned end portion, the end face of which is of substantially the same inner and outer diametral dimensions as the tubular sectioned pipe to which it is to be welded. Secure the pipe 68 in the clamping means 64 with the joint end face 84 of the pipe above and approximately co-axial with the annular ring assembly 45 (see FIG. 2).

Mount the pipe-end fitting 55 in the self-centering chuck 54 and switch on the pressurised air supply to raise the lower jig table until the manually adjustable stop 60 abuts the upper portion 83 of the welding head carriage 31. Then adjust the stop 60 until the joint end face 85 of the pipe-end fitting 55 is co-planar with the plane of orbit of the welding electrode 44. The close proximity of the tip of the welding electrode 44 to the outer periphery of the joint end face 85 of the pipe-end fitting enables this adjustment to be checked by eye with sufficient accuracy.

Adjust the position of the welding head 36 until the pipe-end fitting 55 is in co-axial alignment with annular ring assembly 45. This adjustment is carried out by operating the worm-and-wheel drive means to move the first and the second plate members in their dovetail section slides relative to the welding head carriage and can be checked either visually by rotation of the electrode or by optical means such as a microscope fitted with a graticule.

Next slide the lower carriage 25 along the base 17 until the grinding face 74 of the grinding wheel 73 is vertically below the joint end face 84 of the pipe 68 (that is in referring to FIG. 1. the lower carriage is moved to the left) and then lock the lower carriage in position by operation of the appropriate switch.

Slide the grinding wheel carriage 71 rearwardly with reference to FIG. 1 and lower the plate 62 by means of the lever arm 66 until the joint end face 84 of the pipe 68 lies along a plane fractionally above the plane of the grinding face 74 of the grinding wheel 73. The plate 62 is locked in position by operation of the appropriate switch. The grinding wheel drive motor is switched on and the grinding wheel carriage 71 is manually moved in a reciprocal manner along its line of movement normal to the base front edge base 18. During this reciprocal motion of the carriage 71 the worm-and-wheel drive means 75 is operated to raise the grinding wheel 73 by small increments until the grinding face 74 contacts the whole surface of the joint end face 84 of the pipe to generate on the joint end face 84 of the pipe 68 a surface which is parallel to the base upper surface 17. Release the lock on the plate 62 and slide the plate upwards, then slide the lower carriage 25 after releasing its lock until the welding head carriage 31 is vertically below the joint end face 84 of the pipe.

The next step is to co-axially align the joint end face 84 of the pipe 68 with the joint end face 85 of the pipe-end fitting 55. This is achieved by lowering the plate 62 until the joint end face 84 of the pipe engages with the surface of a steel ball which is rested on the joint end face 85 of the pipe-end fitting and then adjusting the position of the lower carriage 25 and the welding head carriage 31 and the plate 62 until the inner periphery of each of said joint end faces is wholly engaged with the surface of the steel ball. Preferably the diameter of the steel ball is equal to the outer peripheral dimension of each of said joint end faces.

Figure 4:
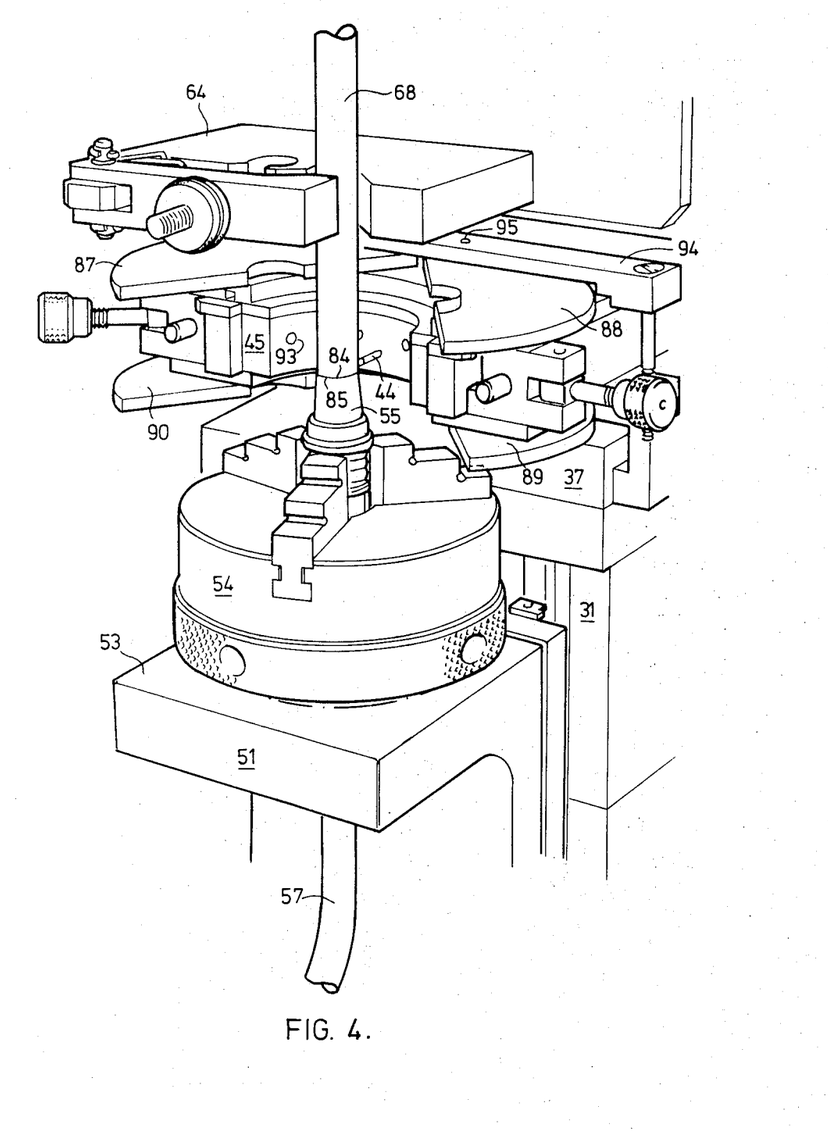

The lower carriage 25 and the welding head carriage 31 are then locked in position by operation of the appropriate switches. The plate 62 is raised, the steel ball is removed and the plate 62 lowered until the joint end faces 84 and 85 abut. The plate 62 is then locked in position by operation of the appropriate switch. Argon gas shrouds 87, 88, 89 and 90 which are each pivotally attached to a clamp 94 by pivot pins 95 to engage the upper and lower surfaces of the welding head 36 (see FIG. 4) are then pivoted to engage the pipe and the pipe-end fitting to substantially enclose a space bounded by the shrouds and the welding head 36.

A selected welding cycle is then programmed on a control apparatus (not shown) which regulates the orbital speed of the welding electrode 44, the electrical current to the welding electrode and the number of orbits of the welding electrode during the welding operation.

Before the welding operation the control apparatus actuates a valve (not shown) to an open position to allow a flow of argon gas from an external source to:
  i. the enclosed space surrounding the abutment of the pipe and the pipe-end fitting via the conduit in the welding head 36 and the holes 93 in the annular ring assembly and
  ii. through the pipes 57 and conduits 58, 59 to the bore of the pipe-end fitting and the pipe.

The argon gas displaces air from said bore through the remote open end of the pipe 68 and from said enclosed space, and by a positive flow of argon gas further ingress of air is prevented.

After the welding operation the control apparatus actuates the argon gas supply valve to the closed position.

It will be appreciated that said valve is actuated to an open position prior to the welding operation to purge out air from the welding zone and is not actuated to the closed position until the welded zone has solidified in order to prevent contamination of the molten metal in the welding zone by chemical reaction with the constituents of the air. Any other inert gas could be used or for the welding of stainless steel materials a mixture of an inert gas and hydrogen could be used.

The selected welding cycle is then initiated.

After the welding cycle is completed the argon gas shrouds are removed and the welded assembly of the pipe and the pipe-end fitting is released from the self-centering chuck 54 and the clamping means 64.

For repetition of the above operation with a pipe and a pipe-end fitting which are respectively substantially identical to those used in the previous operation, the lower jig table 51 is lowered, a pipe-end fitting is located and engaged in the self-centering chuck 54 and the table 51 raised until the stop 60 engages with the upper portion 83 of the welding head carriage. A pipe is engaged in the clamping means 64 and the joint end face of the pipe is ground flat. The joint end faces of the pipe and the pipe-end fitting are then aligned co-axially, using the steel ball, and then abutted with their interface lying along the plane of orbit of the welding electrode without any further adjustment.

Thus in the welding together of batches of similar pipes and pipe-end fittings a considerable saving in time and expense is achieved and good accuracy obtained, particularly so when the pipe-end fittings are not provided with the aforementioned filler lips.

The machine gives advantage when used for assembling a pipe and pipe-end fitting which has an integral filler lip in that complete abutment of the respective end faces of the pipe and the pipe-end fitting is ensured whereas with present practice the abutment cannot be visually inspected because it is hidden by the filler lip. Furthermore, by using the machine to locate the pipe relative to the pipe-end fitting, which has an integral filler lip, it is not necessary to first tack weld them together prior to the circumferential welding operation as is sometimes necessary in present practice.

What we claim is:

1. A machine for use in the welding of a pipe to a pipe-end fitting and comprising
    a main frame having a base and supporting a plurality of carriage means which are each one capable of movement relative one to the other and relative to the main frame to a desired position, a first one of said carriage means being a main transverse carriage and mounted from said base, and a second one of said carriage means being mounted from said transverse carriage; a welding head, which includes an orbital welding electrode, supported by said second one of said carriage means; and means to adjust the position of said welding head relative to said second carriage means in a plane which is parallel to said base, a third one of said carriage means being mounted from said second carriage means for movement in a plane normal to said base, towards or away from said welding head, said third carriage means having mounted thereon a clamping means for rigidly supporting a pipe-end fitting and having an adjustable stop device for maintaining the end face of the pipe-end fitting in a co-planar relationship with said orbital welding electrode.

2. A machine as claimed in claim 1 in which a fourth one of said carriage means is mounted from the main frame for movement in a plane normal to said base, said fourth carriage means having mounted thereon a clamping means for rigidly supporting a pipe.

3. A machine as claimed in claim 2 in which said first, second third and fourth carriage means is each one capable of movement to a respective position, relative to the other ones, so that the pipe and the pipe-end fitting are aligned and abutting one to the other at a respective end face and the plane of the abutting end faces is coplanar with the plane of orbit of the orbital welding electrode.

4. A machine as claimed in claim 3 in which a fifth one of said carriage means in mounted from the main transverse carriage for reciprocal movement thereon; said fifth carriage means supporting a powered grinding wheel, which may be raised or lowered relative to the base of the main frame in order to generate an end face of the pipe which is parallel to the end face of the pipe-end fitting when the grinding wheel is moved to the appropriate position below the pipe by means of movement of the main transverse carriage and said fifth carriage.

* * * * *